May 29, 1928.
J. F. O'CONNOR
1,671,605
HAND BRAKE FOR RAILWAY CARS
Filed March 7, 1924
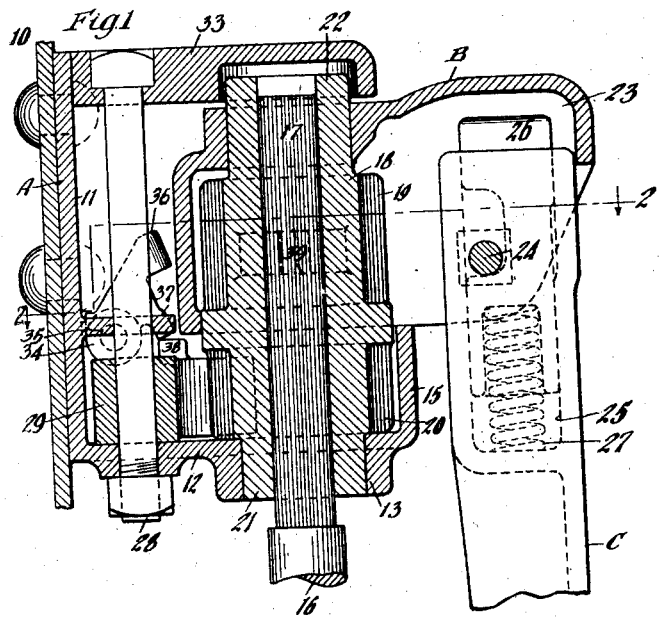
Witnesses
Wm. Geiger
Inventor
John F. O'Connor
By George D. Wright
His Atty.

Patented May 29, 1928.

1,671,605

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

HAND BRAKE FOR RAILWAY CARS.

Application filed March 7, 1924. Serial No. 697,481.

This invention relates to improvements in hand brakes for railway cars.

In the operation of hand brakes for railway cars employing a vertical brake staff, considerable difficulty has been experienced in the failure of the brakes to completely release. Where a binding of the brake staff occurs, due to the end wall of the car becoming bulged, or for other reasons, the friction on the staff is sufficient to prevent the brake chain leading to the brake rigging from becoming fully slack, so that in consequence the shoes remain in contact with the wheels, causing a loss of tractive power of the locomotive, and the wearing out of the brake shoes.

One object of my invention is to provide an arrangement which will positively insure the full release of the brake shoes from the wheels, such arrangement being simple, compact, durable and efficient.

A still further object of the invention is to provide an arrangement of the character above described, having the parts so arranged that the operation will remain substantially the same as at present in certain types of brakes now used, so as not to require any further effort or exertion on the part of the brakeman.

In the drawing, forming a part of this specification, Fig. 1 is a vertical sectional view of a hand brake embodying my improvements. Fig. 2 is a horizontal sectional view corresponding to the section line 2—2 of Fig. 1, and Fig. 3 is a fragmentary vertical sectional view showing the dog in its locked and released positions.

In said drawing 10 denotes the end wall of a car, to which is secured a housing or bracket designated generally by the reference character A. The latter is formed with a back wall 11 riveted, or otherwise rigidly secured to the car wall 10, and with a horizontally extending web or wall 12, having a bearing provided therein as indicated at 13. Said bracket A is also preferably provided with a vertically extending enclosing wall 14, having an arcuate section 15 at its outer end, to provide a partial housing for certain of the parts.

The usual vertical brake staff is indicated at 16, it being understood that the same will have a chain-winding drum at its bottom, over which winds the brake chain leading to the brake rigging. The brake staff is preferably squared at its upper end as indicated at 17 and has secured thereto a ratchet wheel 18, provided with two sets of vertically arranged ratchet teeth, 19 and 20, respectively. The ratchet wheel is formed with a journal 21 at its bottom, rotatable in the bearing 13, and at its top has another journal section 22, on which is rotatably mounted a carrier member B.

The carrier B is of general cylindrical form as indicated and from one side thereof project a pair of parallel flanges 23, between which is pivotally mounted the upper end of the operating lever or handle C, by means of a pivot bolt 24. At its upper end the handle has a longitudinally extending socket 25, within which is slidably mounted a toothed pawl 26, said pawl being normally projected outwardly of the socket by a spring 27 and limited in its outward movement by the bolt 24. The arrangement of the operating handle and pawl carried thereby, is such that when the operating handle is in horizontal or operative position, the pawl 26 will engage with the set of teeth 19 of the ratchet 18, and by oscillating or swinging the handle back and forth in a horizontal plane, the ratchet wheel and staff can be rotated step by step in a winding direction. When the handle is released, it automatically falls to a depending vertical position under the influence of gravity, in which position the pawl 26 is entirely disengaged from the ratchet.

Pivotally mounted on a bolt 28, positioned vertically thru the bracket A, is a locking dog 29, having a tooth 30 adapted to cooperate with the set of ratchet teeth 20 to hold the ratchet in its step by step rotation. On the opposite side of the pivot bolt, the dog has a handle 31, by which it may be disengaged or tripped from the ratchet wheel, against the action of the spring 32, which normally maintains the dog tooth in operative position with the ratchet teeth. A top plate 33 is arranged parallel to the web 12 of the bracket A and is held in place by means of said pivot bolt 28, as shown in Fig. 1.

In order to automatically lock the dog in its inoperative position, so as to permit the complete release of the brake chain, I have arranged the following means—

A latch member 34 is pivoted at one end thereof on the vertical wall 14 by means of a pivot pin 35, so that it may swing or tilt about a horizontal axis. The other end of this latch member is provided with an upper and a lower lug or tooth 36 and 37, respectively, both arranged on the same side of the pivotal axis of the latch. The dog 29 is provided with a projection or lug 38 to cooperate with the tooth 37 of the latch as shown, the upper surface of the lug 38 lying substantially in a horizontal plane, so that when the dog ratchets in a step by step movement over the ratchet teeth 20, the latch will not be lifted thereby but will always support the latch during the ratcheting action.

It will be noted that as substantially all of the weight of the latch is to one side of its pivotal axis so that it is gravity actuated, when the dog is moved to its inoperative position, as indicated in dotted lines in Fig. 3, the tooth 37 of the latch will drop to one side of the lug 38, forming an abutment or stop therefor and preventing the return of said dog to its operative position, and thereby lock it in the inoperative position against the pressure of the spring 32.

In order to automatically trip the latch 34 when the lever C is to be operated for the next application of the brakes, I have formed a horizontally extending lug or cam 39 on the carrier member B, this cam being at such an elevation that when the carrier is oscillated to extreme starting position, the cam will engage the tooth 36 of the latch 34 to tilt the latch upwardly and release the lower tooth 37 from the lug 38 of the dog, thus permitting the spring 32 to press the dog into operative position and maintain the latch in its inoperative elevated position until the dog is again manually released from the ratchet. The operation is as follows:—The brakeman tightens the brake chain in the usual manner by oscillating the handle C, as heretofore described, and at the end of the application of the brakes, the handle is released and allowed to fall to its vertical position, the dog 29 holding the chain under tension. When the brakeman desires to release the brake, he pulls the handle 31, thus disengaging the dog from the ratchet wheel and in so doing, retracts the dog to such an extent that the tooth 37 of the latch will ride over the lug 38 and drop to one side thereof to form a stop therefor and thereby automatically continue to hold the dog in its inoperative position. In starting to apply the brakes in a subsequent action, the operator merely elevates the operating lever to horizontal position and moves the lever to extreme starting position, thus swinging the carrier about its axis and causing the cam 39 to engage the upper tooth 36 of the latch and release the locking dog 29.

The arrangement shown is comparatively simple, does not add materially to the expense of the device, does not require a great deal of attention or experience on the part of the brakeman and efficiently serves the purpose of leaving the brake staff completely free between the time it is released and until it is next actuated to set the brakes.

With this arrangement, should there be any binding of the staff preventing 100% release or slack of the chain when the brake is released in the ordinary manner, the vibration of the car and brake rigging parts, as soon as the car is in motion, will be sufficient to jar the brake chain fully loose and permit the brake shoes clearing the wheels properly, while the dog is positively held out of operative engagement with the ratchet on the staff.

I have herein shown and described what I now consider the preferred manner of carrying out the invention but the same is merely illustrative and I contemplate all changes and modifications that come within the scope of the claims appended hereto.

I claim:

1. In a hand brake for railway cars, the combination with a rotatable member; of means movable about the axis of said member for effecting rotation of said member in one direction and including a ratchet wheel; a manually releasable locking dog movable about an axis substantially parallel to the axis of said member and spring-actuated to normally automatically cooperate with said ratchet wheel to hold the latter against accidental reverse rotation; and a latch mounted on an axis disposed at an angle to the axis of said dog and having a tooth supported on a lug on the latter so as to normally ride on said lug and drop off said lug to lock the dog in inoperative position when said dog is moved manually to inoperative position.

2. In a hand brake for railway cars, the combination with a rotatable member; of means for effecting rotation of said member in one direction and including a ratchet wheel; a manually releasable locking dog, spring-actuated to cooperate with said ratchet wheel to hold the same against accidental reverse rotation; and a latch pivotally mounted above said dog and having an upper and a lower tooth, said lower tooth riding on top of the lug on said dog as the dog ratchets with respect to said ratchet wheel and dropping to abut one side of said lug to lock the dog in inoperative position when said dog is moved manually to inoperative position; and a cam on said first-mentioned means, adapted to cooperate with said upper tooth of the latch and tilt the latch to lift the lower tooth from said dog to release it from its inoperative position when said means are moved to extreme starting position.

3. In a hand brake for railway cars, the combination with a vertical brake staff; of a ratchet wheel thereon; a bracket supporting said ratchet wheel; an operating lever engageable with said ratchet; a carrier member rotatably mounted on said bracket to carry said lever and provided with a horizontally projecting lug on its exterior; a locking dog engageable with said ratchet and having a lug projecting from its top; and a latch pivoted at one end on said bracket so as to be gravity-actuated to swing about an axis at right angles to the axis of rotation of said ratchet and carrier member, and provided with a pair of vertically disposed teeth, one engageable with said lug on the dog and the other engageable with the lug on the carrier, so that when the dog is manually moved to inoperative position, the first-mentioned tooth of the latch will engage with the lug on the dog to lock the dog in released position, holding it in said released position until the carrier member is moved to its extreme starting position, thereby causing the carrier lug to engage the other tooth of the latch and tilt the same to release the other tooth from latching engagement with the dog.

4. In a hand brake for railway cars and the like, the combination with a rotatable element adapted to effect tightening of a brake chain; of means for effecting step by step rotation of said element in one direction; means normally operative to prevent accidental rotation of said element in the reverse direction, said means including a ratchet wheel and movable dog normally co-operating with the ratchet wheel, said dog being manually operable to an inoperative position with respect to the ratchet wheel; a locking latch automatically coperable with said dog to hold it in its released inoperative position when said dog is manually shifted to said inoperative position, said latch being maintained in inoperative position by the dog when the latter is in operative association with the ratchet wheel; and means carried by said first named means for rendering said latch inoperative with respect to the dog when said first named means are subsequently employed to effect step by step rotation of said element.

5. In a hand brake for railway cars, the combination with a rotatable member; of actuating means for effecting rotation thereof in one direction and including a ratchet wheel; a pivoted locking dog spring actuated to normally automatically co-operate with said ratchet wheel to hold the latter against accidental reverse rotation; a latch movable about an axis independent of the axes of said actuating means and said dog, and arranged to co-act with said dog to engage the latter and lock it in inoperative position when the dog is released from engagement with said ratchet wheel; and means operable upon rotation of said actuating means for releasing said latch from locking engagement with said dog.

6. In a hand brake for railway cars, the combination with a vertical brake staff having a ratchet wheel; of actuating means rotatable about the axis of said staff for effecting rotation thereof; a locking dog movable about an axis arranged substantially parallel with the axis of said staff; a latch movable about an axis disposed at an angle to the axes of said staff and dog and having means co-operable with means on said actuating means and on said dog, whereby movement of said dog in a certain direction causes engagement to lock said dog in released position, and movement of said actuating means in a predetermined direction releases said latch to free said dog.

7. In a hand brake for railway cars, the combination with a rotatable member; of a carrier member for effecting rotation thereof in one direction and including a ratchet wheel, said carrier member being swingable in a substantially horizontal plane; a pivoted locking dog spring actuated to normally co-operate with said ratchet wheel to hold the latter against retrograde rotation, said dog being also movable in a substantially horizontal plane; gravity actuated latch means swingable in a substantially vertical direction and having means for locking said dog in inoperative position when the dog is released from engagement with said ratchet wheel; and cam means on said carrier member operable upon rotation of the latter for releasing said latch to permit said dog to resume holding relation with said ratchet wheel.

In witness that I claim the foregoing I have hereunto subscribed my name this 4th day of March 1924.

JOHN F. O'CONNOR.